US007434487B2

(12) United States Patent
Terai

(10) Patent No.: US 7,434,487 B2
(45) Date of Patent: Oct. 14, 2008

(54) TWIN CLUTCH MANUAL GEARBOX

(75) Inventor: Hiromu Terai, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 364 days.

(21) Appl. No.: 10/565,372

(22) PCT Filed: Mar. 21, 2005

(86) PCT No.: PCT/GB2005/001046

§ 371 (c)(1),
(2), (4) Date: Jan. 23, 2006

(87) PCT Pub. No.: WO2005/093288

PCT Pub. Date: Oct. 6, 2005

(65) Prior Publication Data

US 2006/0174722 A1 Aug. 10, 2006

(30) Foreign Application Priority Data

Mar. 22, 2004 (JP) ............................. 2004-082299

(51) Int. Cl.
*F16H 3/087* (2006.01)

(52) U.S. Cl. .......................................... 74/330; 74/340

(58) Field of Classification Search ................... 74/330, 74/340

See application file for complete search history.

(56) References Cited

U.S. PATENT DOCUMENTS 4,658,663 A * 4/1987 Hiraiwa ....................... 74/359
6,675,668 B2 * 1/2004 Schamscha .................. 74/340
7,056,264 B2 * 6/2006 Kupper et al. ............... 477/180
7,225,696 B2 * 6/2007 Gitt ............................ 74/340
7,243,565 B2 * 7/2007 Soeda ......................... 74/329
7,249,532 B2 * 7/2007 Ruedle ........................ 74/330
7,258,032 B2 * 8/2007 Kim ............................ 74/330
7,313,981 B2 * 1/2008 Gumpoltsberger ........... 74/340
2002/0189383 A1 * 12/2002 Schamscha .................. 74/340
2005/0115344 A1 * 6/2005 Kim et al. ..................... 74/331

FOREIGN PATENT DOCUMENTS

DE 101 46 837 A1 11/2003
DE 103 20 280 A1 10/2004
EP 0 344 713 A 12/1989
EP 1 467 128 A 10/2004

* cited by examiner

*Primary Examiner*—Sherry Estremsky
(74) *Attorney, Agent, or Firm*—Global IP Counselors, LLP

(57) ABSTRACT

A twin-clutch manual gearbox has a first input shaft and a second input shaft to which engine rotation is selectively input via individual clutches. The second input shaft is rotatably fitted onto the first input shaft so that the first input shaft protrudes from an end of the second input shaft farthest from the engine. First gearsets are located between the protruding end of the first input shaft and a layshaft located between the first and second input shafts. Second gearsets are located between the second input shaft and the layshaft. The second gearsets are positioned such that the gearset of the lowest gearbox speed which is capable of providing a bearing retaining space between the first input shaft and the second input shaft is positioned farthest from the engine, and the gearset of the highest gearbox speed is positioned closest to the engine.

20 Claims, 2 Drawing Sheets

TWIN CLUTCH MANUAL GEARBOX

CROSS-REFERENCE TO RELATED APPLICATIONS

This nonprovisional application claims priority under 35 U.S.C. §119(a) to Japanese Patent Application No. 2004-082299, filed in Japan on Mar. 22, 2004, the entire contents of which are hereby incorporated by reference.

BACKGROUND OF THE INVENTION

1. Field of the Invention

The present invention generally relates to a so-called twin-clutch manual gearbox. More specifically, the present invention relates to a twin-clutch manual gearbox provided with an automated clutch between the engine and the manual gearbox for each gearbox speed grouping. The twin-clutch manual gearbox is useful for performing automated gearchanging by switching between engaging and disengaging these automated clutches (shifting control) and by alternating gearbox speed selection between both gearbox speed groupings.

2. Background Information

A conventionally known example of such a twin-clutch manual gearbox is the twin-clutch manual gearbox for the front engine, front wheel drive vehicle (referred to as an "FF vehicle"), as described in published Japanese Patent Application No. JP8-320054. The twin-clutch manual gearbox includes a first input shaft and a second input shaft to which engine rotation is selectively input via individual clutches. The hollow second input shaft is rotatably fitted onto the first input shaft, so that the first input shaft protrudes from the rearward end of the second input shaft, being that end farthest from the engine. Sets of gears (referred to as gearsets) associated with one gearbox speed grouping are provided between the rearward end of the protruding first input shaft and a layshaft of the gearbox located parallel to the first and second input shaft, such that appropriate transmission is enabled for respective gearsets. Gearsets associated with another gearbox speed grouping are provided between the second input shaft and the layshaft such that appropriate transmission is enabled for these respective gearsets, and such that rotation according to a selected gearbox speed after a gearchange is output in a radial direction from the forward end of the layshaft closest to the engine.

In such a twin-clutch manual gearbox, when a gearbox speed in one gearbox speed grouping is selected and the corresponding automated clutch is engaged, none of the gearbox speeds from another gearbox speed grouping can be selected. For a gearchange, a gearbox speed in another gearbox speed grouping is selected and, with the corresponding automated clutch disengaged, the automated clutch associated with said one gearbox speed grouping is disengaged while said automated clutch associated with said another gearbox speed grouping is engaged. This enables so-called clutch shifting control and enables automatic gearchanging by alternating gearbox speed selection between both gearbox speed groupings. In this way, automatic gearchanging is enabled on a manual gearbox.

In a twin-clutch manual gearbox for an FF vehicle, considering the convenience of gearbox assembly and because the rotation after gearchange is extracted in a radial direction from the forward end of the layshaft closest to the engine as described above, a favorable composition is to have the maximum diameter of the layshaft at its forward end, gradually decreasing the diameter approaching the rearward end.

However, because a twin-clutch manual gearbox for a front engine, rear wheel drive vehicle (referred to as an "FR vehicle") must output the rotation corresponding to a selected gear after gearchange in an axial direction from the rearward end of the first input shaft or of the layshaft farthest from the engine, it is desirable for the convenience of gearbox assembly and layshaft strength for the layshaft to have a maximum diameter approximately midway (which is aligned near the rearward end of second input shaft), with the diameter gradually reducing from approximately midway toward both the forward end and the rearward end. For example, this construction means it is easier to assemble gearsets on the layshaft conveniently from both its rearward and forward ends.

The conventional layshaft in the twin-clutch manual gearbox for an FF vehicle, therefore, as described in Japanese Patent Application No. JP8-320054, is problematic for use as a layshaft in a twin-clutch manual gearbox for an FR vehicle.

To satisfy only the requirement for a layshaft with the maximum diameter approximately midway, and gradually decreasing in diameter toward the forward end from approximately midway, it would be sufficient to position the gearsets in high gearbox speed order from the forward side of the shaft closest to the engine, because the gearsets associated with the gearbox speed grouping provided between the second input shaft and the layshaft have a gear outer diameter that becomes smaller as the gearbox speed becomes higher. That is, a small diameter gear for a high gearbox speed is provided on the forward end of the layshaft closest to the engine, and the outer diameter of gears on the layshaft grow larger as gear distance from the engine increases. This therefore fulfils the requirement for a composition which puts the maximum layshaft diameter approximately midway, and gradually decreases the diameter toward the forward end from approximately midway.

Meanwhile, as also described in Japanese Patent Application No. JP8-320054, to support the first input shaft and the second input shaft rotatably fitted onto the layshaft, the gearbox housing is bearing the forward end of the second input shaft closest to the engine, and the gearbox housing is bearing the rearward end of the first input shaft protruding from the second input shaft. However, when the gearset associated with the lowest gearbox speed is positioned on the side farthest from the engine as described above, the gear which comprises said lowest gearbox speed gearset and is on the second input shaft has the smallest diameter. Such a gear restricts the size of the annular space between the first input shaft and the rearward end of the second input shaft, so much so that a needle bearing, or other bearing, cannot be retained in the annular space between the first input shaft and the rearward end of the second input shaft. Forming an annular groove in the first input shaft in which to place said needle bearing would cause decreased strength for the first input shaft, so this solution is not a desirable option. A possible alternative may be to move the needle bearing toward the engine to a position where no gears are present, but this would cause the needle bearing to approach the bearing between the forward end of the second input shaft and the forward end of the first input shaft, narrowing the bearing span and making the rigidity of the bearing between both input shafts somewhat deficient. Therefore this alternative solution is also difficult to implement.

SUMMARY OF THE INVENTION

In the light of the aforementioned circumstances, the present invention purposes to provide a twin-clutch manual gearbox particularly useful for FR vehicles, which, by appropriate axial direction positioning of gearsets associated with a gearbox speed grouping provided between the second input shaft and the layshaft, enables retaining a bearing in an annular space between the first input shaft and the rearward end of the second input shaft without forming an annular groove in the first input shaft for retaining a bearing. The invention also satisfies the requirement for a gearbox construction in which the layshaft has a maximum diameter approximately midway, and decreases in diameter toward the forward end.

According to a first aspect of the present invention, therefore, there is provided a twin-clutch manual gearbox for an engine that includes a first input shaft and a second input shaft to which engine rotation is selectively input via individual clutches, the second input shaft being rotatably fitted onto the first input shaft so that the first input shaft protrudes from a rearward end of the second input shaft farthest from the engine. First gearsets associated with a first gearbox speed grouping are located between the rearward end of the protruding first input shaft and a layshaft located substantially parallel to the first and second input shafts such that appropriate transmission is enabled for respective ones of the first gearsets. Second gearsets associated with a second gearbox speed grouping are located between the second input shaft and the layshaft such that appropriate transmission is enabled for respective ones of the second gearsets, whereby rotation according to a selected gear after a gearchange is output in an axial direction from a rearward end of the first input shaft or of the layshaft. The twin-clutch manual gearbox is characterized in that the second gearsets are positioned such that the gearset associated with the lowest gearbox speed of the second gearbox speed grouping, being that one of said gearsets which is capable of providing a bearing retaining space between the first input shaft and the second input shaft, is positioned so as to be farthest from the engine, and the gearset associated with the highest gearbox speed of the remaining gearbox speeds of the second gearbox speed grouping is positioned so as to be closest to the engine.

In other words, the gearset associated with the lowest gearbox speed of the second gearbox speed grouping is positioned axially along the second input shaft on a side thereof farthest from the engine, and the gearset associated with the highest gearbox speed of the remaining gearbox speeds of the second gearbox speed grouping is positioned axially along the second input shaft on a side thereof closest to the engine.

In a further preferred embodiment, the second input shaft is hollow for receiving a forward end of the first input shaft, thereby to define the bearing retaining space therebetween for housing a bearing for a gearset of the second gearbox speed grouping.

Preferably, the second gearsets associated with the remaining gearbox speeds of the second gearbox speed grouping are further positioned in accordance with the following criteria: (i) between a gearset associated with a gearbox speed positioned farthest from the engine and a gearset associated with a gearbox speed positioned closest to the engine and (ii) in such a manner that gearsets associated with higher gearbox speeds are positioned closer to the engine.

The gearsets of the second gearbox speed grouping provided between said second input shaft and the layshaft preferably form an even-numbered gearbox speed grouping. Preferably, therefore, the first gearsets of the first gearbox speed grouping form an odd-numbered gearbox speed grouping.

In a particularly preferred embodiment, a fourth gear gearset of the second gearbox speed grouping is positioned farthest from the engine. A sixth gear gearset of the second gearbox speed grouping is preferably positioned closest to the engine and a second gear gearset is positioned intermediate the fourth and sixth gear gearsets.

From the foregoing it will be appreciated that the twin-clutch manual gearbox of the invention includes a first input shaft and a second input shaft to which engine rotation is selectively input via individual clutches. The second input shaft is hollow and is rotatably fitted onto the first input shaft, so that the first input shaft protrudes from the rearward end of the second input shaft farthest from the engine. Sets of gears (referred to as gearsets) associated with one gearbox speed grouping are provided between the rearward end of this protruding first input shaft and a layshaft located parallel to the first and second input shaft such that appropriate transmission is enabled for respective gearsets. Gearsets associated with another gearbox speed grouping (the other gearbox speed grouping) are provided between the second input shaft and the layshaft such that appropriate transmission is enabled for the gearsets of the other gearbox speed grouping, whereby rotation according to a selected gear after gearchange is output in an axial direction from the rearward end of the first input shaft or of the layshaft.

In such a twin-clutch manual gearbox, the gearsets associated with the other gearbox speed grouping are provided between the second input shaft and the layshaft are positioned so that, of the gearbox speeds on the second input shaft, the gearset associated with the lowest gearbox speed with a gear outer diameter capable of providing a specified bearing retaining space between the first input shaft and the second input shaft is positioned on a side thereof farthest from the engine, and, of the remaining gearbox speeds, the gearset associated with the highest gearbox speed is positioned on a side thereof closest to the engine.

In such a twin-clutch manual gearbox, upon positioning gearsets associated with a gearbox speed grouping provided between the second input shaft and the layshaft, because the gearset associated with the lowest gearbox speed of the gearbox speeds on the second input shaft (with a gear outer diameter capable of providing a specified bearing retaining space between the first input shaft and the second input shaft) is positioned on the side farthest from the engine, the specified space can be secured for retaining a bearing between the first input shaft and the rearward end of the second input shaft, without forming an annular groove in the first input shaft for retaining a bearing. Thus, a bearing can be retained between the first input shaft and the rearward end of the second input shaft without also reducing the strength of the first input shaft. Therefore, according to the present invention, the bearing span for the bearing provided between both input shafts can be large, which enables maintaining high bearing rigidity between both input shafts.

The invention thus fulfils strength requirements for the gearbox, as well as the requirement for a layshaft composition in which the diameter decreases toward the forward end (relative to the engine), from approximately midway. This is because upon positioning gearsets associated with a gearbox speed grouping provided between the second input shaft and the layshaft, the gearset associated with the highest gearbox speed of the remaining gearbox speeds is positioned on the side closest to the engine, and therefore the forward end of the layshaft closest to the engine can have a small diameter because the gear on the layshaft comprising the relevant gearset has a small diameter (i.e. due to it representing the highest gearbox speed).

The first and second shafts and the layshaft may be considered to constitute a shaft arrangement, the twin-clutch manual gearbox further comprising at least one interlocking mechanism for enabling, respectively, appropriate transmission of gearsets associated with the second gearbox speed grouping.

The twin-clutch manual gearbox may further comprise a plurality of interlocking mechanisms for enabling, respectively, appropriate transmission of gearsets associated with the second gearbox speed grouping, wherein the plurality of interlocking mechanisms is provided between the second input shaft and said layshaft on a layshaft side of the shaft arrangement.

Preferably, one of the interlocking mechanisms is a specialized interlocking mechanism for enabling appropriate transmission of the gearset positioned closest to the engine, and wherein the specialized interlocking mechanism is positioned between the gearset positioned closest to the engine and a gearset positioned adjacent to said gearset closest to the engine.

The second gearsets associated with the second gearbox speed grouping form a grouping of a second gear gearset, a fourth gear gearset and a sixth gear gearset. It is preferable for the fourth gear gearset to be positioned on a side of the layshaft farthest from the engine, the sixth gear gearset to be positioned on a side of the layshaft closest to the engine and the second gear gearset to be positioned in between the fourth and sixth gear gearsets. An interlocking mechanism common to the second gear gearset and the fourth gear gearset is positioned between the second gear gearset and the fourth gear gearset, and a specialized interlocking mechanism for the sixth gear gearset is positioned between the second gear gearset and the sixth gear gearset.

Typically, the sixth gear gearset comprises, in a mutually interlocking manner, a sixth gear input gear which is formed as one unit onto an outer diameter of the second input shaft, and a sixth gear output gear which is rotatably provided on the layshaft. The second gear gearset typically comprises, in a mutually interlocking manner, a second gear input gear which is formed as one unit onto the outer diameter of the second input shaft and a second gear output gear which is rotatably provided on the layshaft. Finally, the fourth gear gearset typically comprises, in a mutually interlocking manner, a fourth gear input gear which is formed as a single unit onto the outer diameter of the second input shaft and a fourth gear output gear which is rotatably provided on the layshaft.

The twin-clutch manual preferably has a layshaft with a maximum diameter approximately at a midway point and, more preferably, at a midway point in a position equivalent to a boundary between the second gearsets and the first gearsets.

According to a second aspect of the invention, there is provided a vehicle fitted with a twin-clutch manual gearbox as set out in the first aspect.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

An embodiment of the present invention is described in detail below, according to the embodiment indicated in the figures. The twin-clutch manual gearbox of this embodiment has the following composition and is useful for a front engine, rear wheel drive vehicle (referred to as an FR vehicle).

Figure 1:
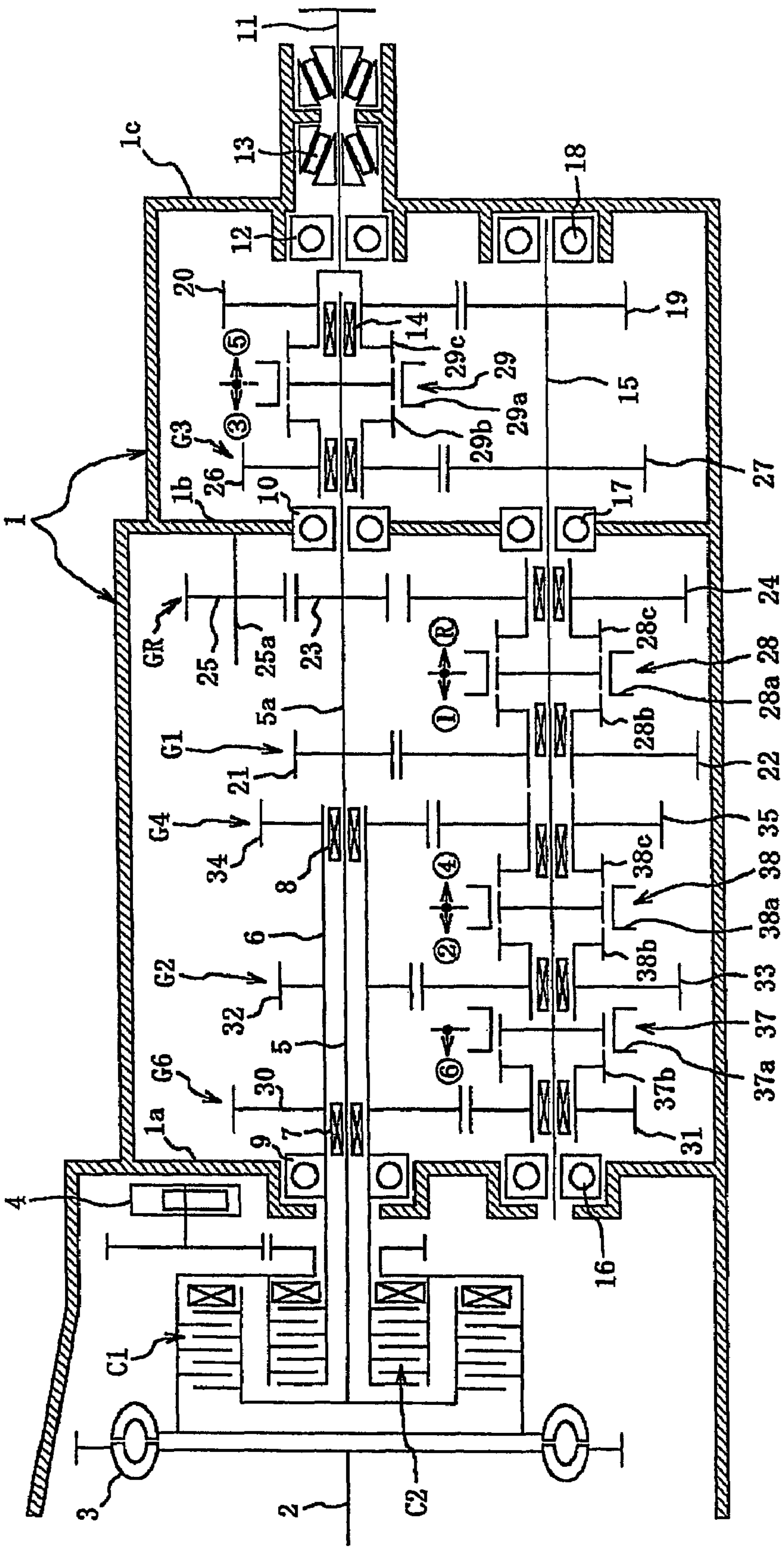
FIG. 1 is a framework drawing indicating a twin-clutch manual gearbox in one embodiment of the present invention.

In FIG. 1, a gearbox housing is referred to generally as 1. The gearbox is provided with a first automated clutch, C1, for odd-numbered gearbox speeds (first gear, third gear, fifth gear and reverse gear) and a second automated clutch, C2, for even-numbered gearbox speeds (second gear, fourth gear, sixth gear). The first and second automated clutches, C1 and C2, are interposed between a gearchange mechanism that is housed within the gearbox housing 1, as described further below, and the engine (not identified, although FIG. 1 shows a crankshaft 2 of the engine). Both clutches C1 and C2 are connected to the engine crankshaft 2, buffered via a torsional damper 3. An oil pump 4 is further provided within the gearbox housing 1, and this oil pump 4 is constantly engine-driven via the torsional damper 3. Operating oil from the oil pump 4 is the medium for performing gearbox speed selection control, including engaging control for clutches, C1 and C2, as described further below. The gear-changing mechanism retained within the gearbox housing 1 is explained below, referring to FIG. 2 also.

The gear-changing mechanism is provided with a first input shaft 5 and a second input shaft 6, to which engine rotation is selectively input from the torsional damper 3 via the odd-numbered gearbox speed clutch C1 and the even-numbered gearbox speed clutch C2. The second input shaft 6 is hollow, and is fitted onto the first input shaft 5. A front needle bearing 7 and a rear needle bearing 8 are interposed in an annular space between the shafts 5, 6, such that the first input shaft 5 (being the inner shaft) and the second input shaft 6 (being the outer shaft) can freely rotate in their mutually concentric state.

The forward ends of the first input shaft 5 and the second input shaft 6 penetrate through the front wall la of the gearbox housing 1 toward the engine and connect to a corresponding one of the clutches, C1 and C2. The second input shaft 6 forward end outer perimeter is rotatably supported on the gearbox housing 1 front wall 1*a* by a first ball bearing 9. The front needle bearing 7 is positioned nearby, in close proximity to the first ball bearing 9, and the rear needle bearing 8 is positioned at the rearward end of the second input shaft 6, farthest from, or remote from, the engine. The first input shaft 5 protrudes from the second input shaft 6 rearward end, penetrating through the gearbox housing 1 intermediate wall 1*b* and, in this penetrating region, the first input shaft 5 at the rearward end 5*a* is rotatably supported on the gearbox housing intermediate wall 1*b* by a second ball bearing 10.

An output shaft 11 is provided coaxially so as to abut against the first input shaft 5 at the rearward end 5*a*. The output shaft 11 is rotatably supported on the rearward end wall 1*c* of the gearbox housing 1 by a taper roller bearing 12 and an axial bearing 13, and also rotatably supported on the first input shaft 5 at the rearward end 5*a* via a needle bearing 14. A layshaft 15 is provided parallel to the first input shaft 5, the second input shaft 6 and the output shaft 11, and this is rotatably supported by roller bearings 16, 17, and 18 on the forward end wall 1*a,* the intermediate wall 1*b,* and the rearward end wall 1*c* of the gearbox housing 1. At the rearward end of the layshaft 15, a laygear 19 is provided to rotate as a unit. In the same plane perpendicular to the axis of the shaft 11, an output gear 20 is provided on the output shaft 11. The laygear 19 and the output gear 20 are mutually interlocked to engage the layshaft 15, thereby to drive the output shaft 11.

Gearsets associated with the odd-numbered gearbox speed (first gear, third gear, reverse gear) grouping are provided between the rearward end 5*a* of the first input shaft 5 and the layshaft 15. That is, a first gear gearset G1, a reverse gearset GR, and a third gear gearset G3 are positioned sequentially, working from the front end of the shaft 5 which is closer to the engine toward the rear end of the shaft 5 which is furthest from the engine. The first gear gearset G1 and reverse gearset GR are positioned between the rearward end of the second input shaft 6 and the gearbox housing intermediate wall 1*b*, and the third speed gearset G3 is positioned in the immediate vicinity on the opposite side of the gearbox housing intermediate wall 1*b*.

The first gear gearset G1 comprises, in a mutually interlocking manner, a first gear input gear 21 formed as a single unit with the rearward end 5*a* of the first input shaft 5, and a first gear output gear 22 which is rotatably provided on the layshaft 15. The reverse gearset GR comprises a reverse input gear 23 formed as a single unit with the rearward end 5*a* of the first input shaft, a reverse output gear 24 rotatably provided on the layshaft 15, and a reverse idler gear 25 which interlocks with these gears 23, 24 and engages to drive these gears 23, 24 under reverse rotation. The reverse idler gear 25 is rotatably supported by a shaft 25*a* embedded in the gearbox housing intermediate wall 1*b*. The third gear gearset G3 comprises, in a mutually interlocking manner, a third gear input gear 26 which is rotatably provided on the rearward end 5*a* of the first input shaft 5, and a third gear output gear 27. The third gear gearset G3 engages to drive the layshaft 15.

On the layshaft 15, a first gear-reverse synchronizing interlock mechanism 28 is further provided, positioned between the first gear output gear 22 and the reverse output gear 24. The first gear-reverse synchronizing interlock mechanism 28 may take the form of a dog-clutch mechanism and enables selection of the first gear, as described further below, when a coupling sleeve 28*a* of said mechanism 28 moves from a neutral position (as shown in the Figures) toward the left and interlocks with the clutch gear 28*b*, thus engaging the first gear output gear 22 to drive the layshaft 15. Selecting reverse is enabled, as described further below, when the coupling sleeve 28*a* moves from a neutral position (as shown in the Figures) toward the right and interlocks with the clutch gear 28*b*, engaging the reverse output gear 27 to drive the layshaft 15.

On the rearward end 5*a* of the first input shaft 5, a third gear-fifth gear synchronizing interlock mechanism 29 is provided, for example a dog-clutch mechanism. The third gear-fifth gear synchronizing interlock mechanism 29 is positioned between the third gear input gear 26 and the output gear 20 and enables selection of the third gear, as described further below, when a coupling sleeve 29*a* of said mechanism 29 moves from the neutral position (as shown in the Figures) toward the left and interlocks with the clutch gear 29*b*, engaging the third gear input gear 26 to drive the first input shaft 5. Selecting the fifth gear is enabled, as described further below, when the coupling sleeve 29*a* moves from the neutral position (as shown in the Figures) toward the right and interlocks with the clutch gear 29*c*, directly linking the first input shaft 5 to the output gear 20 (i.e. to the output shaft 11).

Between the hollow, second input shaft 6 and the layshaft 15, a set of gearsets associated with the even-numbered gearbox speed grouping (second gear, fourth gear, sixth gear) is provided. That is, a sixth gear gearset G6, a second gear gearset G2 and a fourth gear gearset G4 are positioned sequentially along the second input shaft 6 from the front side, or front end, closest to the engine. The sixth gear gearset G6 is positioned along the gearbox housing 1 front wall 1*a* at the forward end of the second input shaft 6, the fourth gear gearset G4 is positioned at the rearward end of the second input shaft 6, and the second gear gearset G2 is positioned substantially at the centre portion between the two ends of the second input shaft 6.

The sixth gear gearset G6 comprises, in a mutually interlocking manner, a sixth gear input gear 30, formed as one unit onto the outer diameter of the second input shaft 6, and a sixth gear output gear 31 rotatably provided on the layshaft 15. The second gear gearset G2 comprises, in a mutually interlocking manner, a second gear input gear 32 formed as one unit onto the outer diameter of the second input shaft 6, and a second gear output gear 33 rotatably provided on the layshaft 15. The fourth gear gearset G4 comprises, in a mutually interlocking manner, a fourth gear input gear 34 formed as a single unit onto the outer diameter of the second input shaft 6 and a fourth gear output gear 35 rotatably provided on the layshaft 15.

There now follows an explanation for the above positioning of the even-numbered gearbox speed grouping (second gear, fourth gear, sixth gear) gearsets, G2, G4, and G6, which are provided between the second input shaft 6 and the layshaft 15. That is, the reason is explained for positioning the sixth gear gearset G6, the second gear gearset G2, and fourth gear gearset G4, sequentially in the order G6, G2, G4, starting from the front end of the shaft 6 near the engine. In the following description, the gearsets G2, G4 and G6 are referred to as the "even gearset group" and the gearsets G1, G3, GS are referred to as the "odd gearset group".

In light of the requirement for the needle bearings 7 and 8 to be interposed between the first and second input shafts, 5 and 6, the gearsets G2, G4, and G6 associated with the even-numbered gearbox speed grouping (second gear, fourth gear, sixth gear) are positioned in the above mentioned manner. The rearward needle bearing 8 is preferably positioned in the vicinity of the rearward end of the second input shaft 6 due to bearing span and, due to the preferable requirement that the layshaft 15, for strength and for reasons of assembling the gear, is shaped such that its largest diameter is approximately midway at a position equivalent to a boundary between an even-numbered gearbox speed grouping (second gear, fourth gear, sixth gear) and an odd-numbered gearbox speed grouping (first gear, third gear, fifth gear, reverse). In other words, reference to the largest diameter of the layshaft 15 being "midway" means that the largest diameter of the layshaft 15 is approximately at a position in between the gearsets of the even-numbered speed grouping (second gear, fourth gear, sixth gear), being those on the second input shaft 6, and the gearsets of the odd-numbered gearbox speed grouping (first gear, third gear, fifth gear, reverse), being those on the first input shaft 5.

Figure 2:
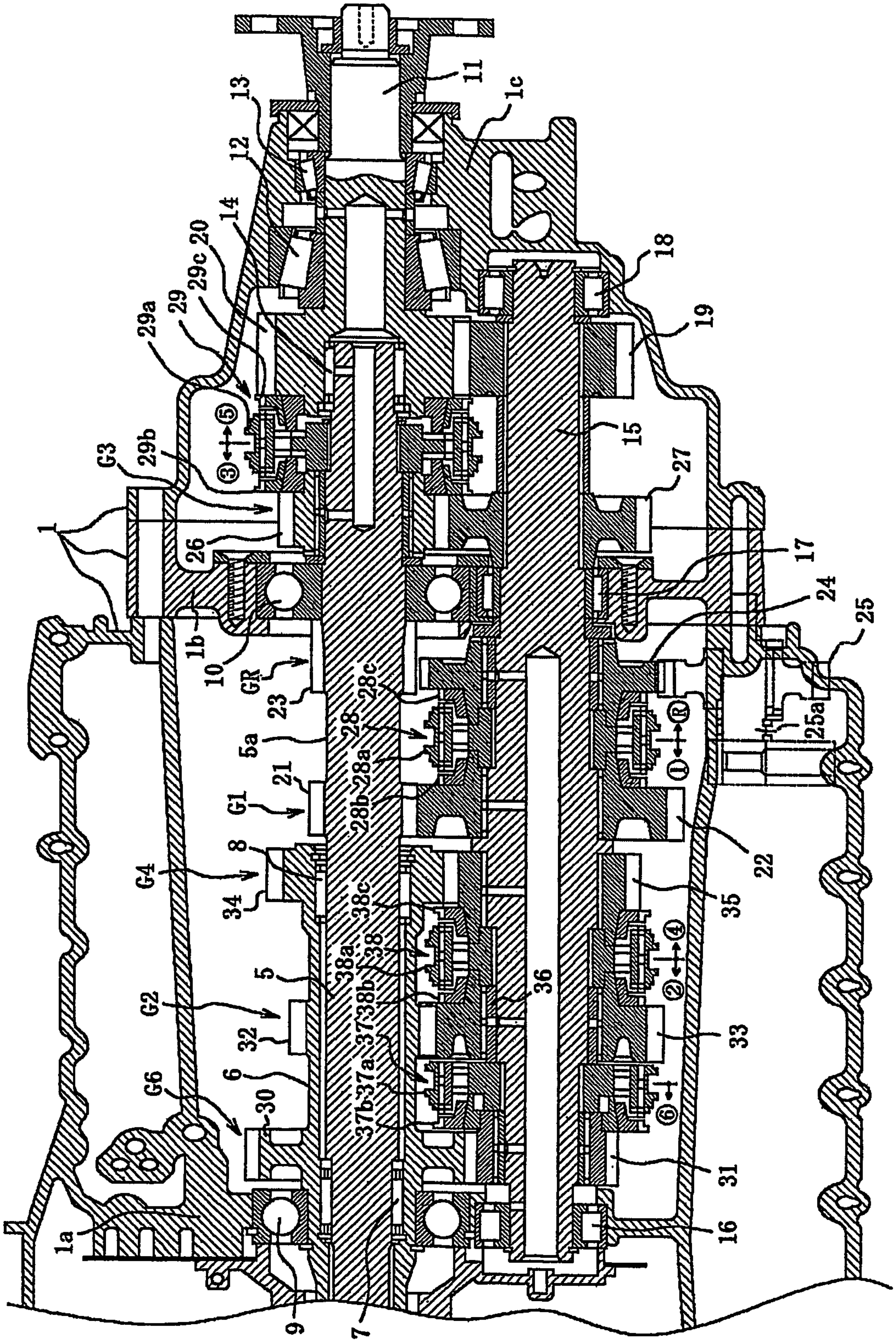
FIG. 2 is a vertical section side view indicating a realistic composition of the same twin-clutch manual gearbox as that shown in FIG. 1.

It is also favorable for the layshaft 15 to be shaped and positioned such that its diameter tapers down toward the forward end of the shaft 15. In other words, the diameter of the layshaft 15 reduces in diameter in a uniform, stepped taper (as seen in FIG. 2) towards its front end which is closer to the engine. The front end of the layshaft 15 will also be referred to as the front side of the layshaft 15.

The input gears 30, 32, and 34 are formed on the second input shaft 6, and so gearbox speeds are selected relative to the input gears 30 and 34 (sixth gear and fourth gear) which have an outer diameter capable of providing a bearing retaining space for the needle bearing 8 between the first input shaft 5 and the second input shaft 6. The gearset G4 associated with the lowest gearbox speed (fourth gear) among the even gearset group is positioned on the side farthest from the engine and the gearset G6 associated with the highest gearbox speed (sixth gear) among the remaining gearbox speeds (sixth gear and second gear) of the even gearset group is positioned on the side closest to the engine. In other words, the gearset G4 associated with the lowest gearbox speed (fourth gear) among the even gearset group is positioned further toward the end of the layshaft 15 farthest from the engine and the gearset G6 associated with the highest gearbox speed (sixth gear) among the remaining gearbox speeds (sixth gear and second gear) of the even gearset group is positioned further toward the end of the layshaft 15 closest to the engine. The remaining gearset G2 of the even gearset group (second gear) is positioned between the gearsets G4 and G6, which are thus positioned one on either side of the gearset G2.

The example in the figures uses the three even gearbox speeds of second gear, fourth gear, and sixth gear. Therefore, the remaining gearbox speed positioned between the gearsets on both sides is solely the second gear, and the positioning order of the relevant remaining gearbox speeds will not be a problem. However, if there exists a plurality of remaining gearbox speeds to position between the gearsets on both sides, then given the requirement to decrease the diameter of the layshaft 15 toward the forward end from approximately midway, the gearsets for these gearbox speeds should be positioned with higher gearspeeds located closer to the engine.

In the example given in the Figures, the gear 33 on the layshaft 15 comprising the second gear gearset G2 has a larger diameter than the gear 35 on the layshaft 15 comprising the fourth gear gearset G4, and the layshaft 15 outer diameter in the gear 33 installation position tends to be larger than the outer diameter in the gear 35 installation position. This tendency can be easily resolved using a countermeasure such as interposing an annular spacer 36 (see FIG. 2) between the gear 33 and the layshaft 15, so that the gearset positioning does not prevent fulfilling the requirement for tapering the layshaft 15 toward its front end from approximately the aforementioned midpoint.

On the layshaft 15, a specialized sixth-gear synchronizing interlock mechanism 37 is further provided, positioned between the sixth gear output gear 31 and the second gear output gear 33. The sixth-gear synchronizing interlock mechanism 37 may be in the form of a dog-clutch type of mechanism and enables selection of the sixth gear, as described below, when a coupling sleeve 37*a* of said mechanism 37 moves from a neutral position (as shown in the Figures) toward the left and interlocks with the clutch gear 37*b*, thus engaging the sixth gear output gear 31 to drive the layshaft 15.

Also, on the layshaft 15, a second gear-fourth gear synchronizing interlock mechanism 38 is provided, positioned between the second gear output gear 33 and the fourth gear output gear 35. The second gear-fourth gear synchronizing interlock mechanism 38 may take the form of a dog-clutch mechanism and enables selection of the second gear, as described further below, when a coupling sleeve 38*a* of said mechanism 38 moves from a neutral position (as shown in the Figures) toward the left and interlocks with the clutch gear 38*b*, thus engaging the second gear output gear 33 to drive the layshaft 15. Selecting the fourth gear is enabled, as described further below, when the coupling sleeve 38*a* moves from a neutral position (as shown in the Figures) toward the right and interlocks with the clutch gear 38*c*, engaging the reverse output gear 35 to drive the layshaft 15.

The operation of the twin-clutch manual gearbox in the embodiment above will now be explained in further detail. In the neutral (N) range or park (P) range where power transmission is not desired, both clutches C1 and C2 are engaged, but the coupling sleeves 28*a*, 29*a*, 37*a*, and 38*a* of the synchronizing interlock mechanisms 28, 29, 37, and 38 are all positioned in their neutral positions, as shown in the Figures, such that the twin-clutch manual gearbox does not perform power transmission. In the D range where forward power transmission is desired, or in the R range where reverse power transmission is desired, operation oil from the oil pump 4 is used as the medium to control the coupling sleeves 28*a*, 29*a*, 37*a*, and 38*a* of the synchronizing interlock mechanisms 28, 29, 37, and 38, so as to control the clutches C1 and C2 and, thus, enabling selection of each forward transmission speed or reverse transmission speed.

When the first gear is desired in the D range, the previously engaged clutch C1 is disengaged, the coupling sleeve 28*a* of the synchronizing interlock mechanism 28 is moved to the left, engaging the gear 22 to drive the layshaft 15, and then the clutch C1 is engaged. Thus, engine rotation from the clutch C1 is output in an axial direction from the output shaft 11 via the first input shaft 5, the first gear gearset G1, the layshaft 15, and the output gearsets 19 and 20, thus enabling power transmission in the first gear. It will be understood by the skilled person that when selection of the first gear is for starting, the clutch C1 engaging process is controlled accordingly.

To up-shift from the first gear to the second gear, the previously engaged clutch C2 is disengaged, the coupling sleeve 38*a* of the synchronizing interlock mechanism 38 is moved to the left, engaging the gear 33 to drive the layshaft 15, and then the clutch C1 is disengaged while the clutch C2 is engaged (clutch shifting), thus shifting up from the first gear to the second gear. After this up-shift is complete, the coupling sleeve 28*a* of the synchronizing interlock mechanism 28 is returned to the neutral position, separating the gear 22 from the layshaft 15, after which the clutch C1 is engaged. Thus, engine rotation from the clutch C2 is output in an axial direction from the output shaft 11 via the second input shaft 6, the second gear gearset G2, the layshaft 15, and the output gearsets 19 and 20, enabling power transmission in the second gear.

To up-shift from the second gear to the third gear, the previously engaged clutch C1 is disengaged, the coupling sleeve 29*a* of the synchronizing interlock mechanism 29 is moved to the left, engaging the gear 26 to drive the first input shaft 5, and then the clutch C2 is disengaged while the clutch C1 is engaged (clutch shifting), thus shifting up from the second gear to the third gear. After this up-shift is complete, the coupling sleeve 38*a* of the synchronizing interlock mechanism 38 is returned to the neutral position, separating the gear 33 from the layshaft 15, after which the clutch C2 is engaged. Thus, engine rotation from the clutch C1 is output in an axial direction from the output shaft 11 via the first input shaft 5, the third gear gearset G3, the layshaft 15, and the output gearsets 19 and 20, thus enabling power transmission in the third gear.

To up-shift from the third gear to the fourth gear, the previously engaged clutch C2 is disengaged, the coupling sleeve 38*a* of the synchronizing interlock mechanism 38 is moved to the right, engaging the gear 35 to drive the layshaft 15, and then the clutch C1 is disengaged while the clutch C2 is engaged (clutch shifting), thus shifting up from the third gear to the fourth gear. After this up-shift is complete, the coupling sleeve 29*a* of the synchronizing interlock mechanism 29 is returned to the neutral position, separating the gear 36 from the first input shaft 5, after which the clutch C1 is engaged. Thus, engine rotation from the clutch C2 is output in an axial direction from the output shaft 11 via the second input shaft 6, the fourth gear gearset G4, the layshaft 15, and the output gearsets 19 and 20, enabling power transmission in the fourth gear.

To up-shift from the fourth gear to the fifth gear, the previously engaged clutch C1 is disengaged, the coupling sleeve 29*a* of the synchronizing interlock mechanism 29 is moved to the right, directly linking the first input shaft 5 to the output shaft 11, and then the clutch C2 is disengaged while the clutch C1 is engaged (clutch shifting), thus shifting up from the fourth gear to the fifth gear. After this up-shift is complete, the coupling sleeve 38*a* of the synchronizing interlock mechanism 38 is returned to the neutral position, separating the gear 35 from the layshaft 15, after which the clutch C2 is engaged. Thus, engine rotation from the clutch C1 is output in an axial direction from the output shaft 11 via the first input shaft 5 and the coupling sleeve 29*a,* enabling power transmission in the fifth gear (gear speed ratio 1:1).

To up-shift from the fifth gear to the sixth gear, the previously engaged clutch C2 is disengaged, the coupling sleeve 37*a* of the synchronizing interlock mechanism 37 is moved to the left, engaging the gear 31 to drive the layshaft 15, and then the clutch C1 is disengaged while the clutch C2 is engaged (clutch shifting), thus shifting up from the fifth gear to the sixth gear. After this up-shift is complete, the coupling sleeve 29*a* of the synchronizing interlock mechanism 29 is returned to the neutral position, dissolving the direct connection between the first input shaft 5 and the output shaft 11, after which the clutch C1 is engaged. Thus, engine rotation from the clutch C2 is output in an axial direction from the output shaft 11 via the second input shaft 6, the sixth gear gearset G6, the layshaft 15, and the output gearsets 19 and 20, enabling power transmission in the sixth gear.

To downshift sequentially from the sixth gear to the first gear, a specified downshift can be performed by performing the aforementioned upshift control in a reverse order.

In the R range, where reverse power transmission is desired, the clutch C1 previously engaged in the N range is disengaged, the coupling sleeve 28*a* of the synchronizing interlock mechanism 28 is moved to the right, engaging the gear 24 to drive the layshaft 15, and then the clutch C1 is engaged. Thus, engine rotation from the clutch C1 is output in an axial direction from the output shaft 11 via the first input shaft 5, the reverse gearset GR, the layshaft 15, and the output gearsets 19 and 20, thus enabling power transmission in the reverse gear. It will be understood by a skilled person that when starting in the reverse gear, the clutch C1 engaging process is controlled accordingly.

In the twin-clutch manual gearbox embodiment described above, of the gears 30, 32, and 34 formed on the second input shaft 6, the gearset G4 associated with the lowest gearbox speed (fourth gear) of the gearbox speeds (relative to the sixth and fourth gears 30 and 34) is positioned on the side of the gearbox farthest from the engine, the gears 30 and 34 having an outer diameter capable of providing a bearing retaining space for the needle bearing 8 between the first input shaft 5 and the second input shaft 6. Therefore, the space can be secured for retaining the needle bearing 8 between the first input shaft 5 and the rearward end of the second input shaft 6, without the requirement to form an annular groove in the first input shaft 5 for retaining a bearing. Moreover, the needle bearing 8 can be retained between the first input shaft 5 and the rearward end of the second input shaft 6 without reducing the strength of the first input shaft 5. Therefore, according to the present invention, the bearing span for the needle bearings 7 and 8 provided between both input shafts 5 and 6 can be large, which enables maintaining high bearing rigidity between both input shafts 5 and 6.

In addition, the embodiment described above enables fulfilling strength requirements as well as satisfying the requirement for the assembly needs of the layshaft 15 structure, in which the diameter decreases toward its forward end from approximately midway. This is because upon positioning the gearsets G2, G4, and G6 associated with the odd-numbered gearbox speed grouping (second gear, fourth gear, sixth gear) provided between the second input shaft 6 and the layshaft 15, the gearset G6 associated with the highest gearbox speed (sixth gear) of the remaining gearbox speeds (second gear, sixth gear) of the even gearset group is positioned on the side closest to the engine. Therefore, the forward end of the layshaft 15 closest to the engine can have a small diameter because the gear 31 on the layshaft 15 comprising this gearset G6 has a small diameter due to being the highest gearbox speed.

If the gearbox speed grouping provided between the second input shaft 6 and the layshaft 15 numbers more than the three described in the present embodiment, and there exists a plurality of remaining gearbox speeds to position between the gearset on the side farthest from the engine and the gearset on the side closest to the engine, the requirement to narrow the layshaft 15 toward the forward end, from approximately midway, can be met by positioning the gearsets for this plurality of gearbox speeds such that gearsets representing the higher gearspeeds are located closer to the engine.

Also, when the gearbox speed grouping provided between the second input shaft 6 and the layshaft 15 is an even-numbered gearbox speed grouping, as shown in the Figures, the practicality of placing the fourth gear gearset G4 on the side farthest from the engine has been confirmed, because even when the even-numbered gearbox speed grouping contains not merely three even-numbered gearbox speeds but exceeds this number, the fourth gear is compatible with the requirement for a practical and favorable gear speed ratio, just as in the pictured example.

In addition, in the present embodiment, because all of the synchronizing interlock mechanisms 38 and 37 for enabling appropriate transmission for the gearsets G2, G4, and G6 associated with the gearbox speed grouping provided between the second input shaft 6 and the layshaft 15 (second gear, fourth gear, sixth gear) are positioned on the layshaft side of the shafts 5, 6, 15, there is no need to provide the synchronizing interlock mechanisms 38, 37 on the second input shaft 6. This is of benefit as the input shaft 6 is hollow and tends to be formed with thin walls due to space restrictions in the radial direction. This aspect of the invention is highly advantageous for avoiding decreased rigidity of the second input shaft 6.

Furthermore, among the gearsets G2, G4, and G6 associated with the even gearbox speed grouping (second gear, fourth gear, sixth gear) provided between the second input shaft 6 and the layshaft 15, for enabling appropriate transmission of the gearset G6 positioned closest to the engine a specialized interlocking mechanism 37 is positioned between the gearset G6 positioned closest to the engine and the adjacently positioned gearset G2. Therefore, no synchronizing interlock structure (including a clutch gear such as the clutch gear 37*b*) is present between this interlock mechanism 37 and the gearset G2 (gear 33). This enables the gearset G2 (gear 33) to be brought into closer proximity with the gearbox housing front wall 1*a* bearing support portion (roller bearing) 16 for the layshaft 15, thus allowing provision of sufficient support rigidity for the gearset G2 (gear 33) to withstand a high torque involved when transmitting said high torque due to a major decrease in gear speed ratio.

All of said operational effects can be implemented when, the gearsets G2, G4, and G6 associated with the even gearbox speed grouping (second gear, fourth gear, sixth gear), being those provided between the second input shaft 6 and the layshaft 15 are positioned as described above, the interlock mechanisms 38 and 37 for enabling appropriate transmission for these gearsets G2, G4, and G6 are positioned on the layshaft 15, as the interlock mechanisms are positioned on the layshaft 15, as the interlock mechanism 38 common to the second gear and the fourth gear is positioned between the second gear gearset G2 and the fourth gear gearset G4, and as the specialized interlock mechanism 37 for the sixth gear is positioned between the second gear gearset G2 and the sixth gear gearset G6. The arrangement described is extremely beneficial as a forward travel sixth speed twin-clutch manual gearbox for an FR vehicle.

Having described these particular preferred embodiments of the invention, however, it is to be appreciated that these embodiments are exemplary only and that variations and modifications such as will occur to those possessed of the appropriate knowledge and skills may be made without departure from the scope of the invention as set forth in the appended claims.

The invention claimed is:

1. A twin-clutch manual gearbox for an engine, the gearbox including:

a first input shaft and a second input shaft to which engine rotation is selectively input via individual clutches, the second input shaft being rotatably fitted onto the first input shaft so that the first input shaft protrudes from a rearward end of the second input shaft farthest from the engine, first gearsets associated with a first gearbox speed grouping, the first gearsets being located between the rearward end of the protruding first input shaft and a layshaft located substantially parallel to the first and second input shafts such that appropriate transmission is enabled for respective ones of the first gearsets, second gearsets associated with a second gearbox speed grouping, the second gearsets being located between the second input shaft and the layshaft such that appropriate transmission is enabled for respective ones of the second gearsets, whereby rotation according to a selected gear after a gearchange is output in an axial direction from a rearward end of the first input shaft or of the layshaft, the twin-clutch manual gearbox being characterized in that the second gearsets are positioned such that the gearset associated with the lowest gearbox speed of the second gearbox speed grouping capable of providing a bearing retaining space between the first input shaft and the second input shaft is positioned so as to be farthest from the engine, and the gearset associated with the highest gearbox speed of the remaining gearbox speeds of the second gearbox speed grouping is positioned so as to be closest to the engine.

2. The twin-clutch manual gearbox as claimed in claim 1, wherein the second input shaft is hollow for receiving a forward end of the first input shaft, thereby to define the bearing retaining space therebetween for housing a bearing for a gearset of the second gearbox speed grouping.

3. The twin-clutch manual gearbox as claimed in claim 2, wherein the second gearbox speed grouping includes a further gearset associated with a gearbox speed intermediate the lowest and highest gearbox speeds, and the further gearset being positioned intermediate the gearset associated with the lowest gearbox speed and the gearset associated with the highest gearbox speed.

4. The twin-clutch manual gearbox as claimed in claim 2, wherein the second gearsets associated with the remaining gearbox speeds of the second gearbox speed grouping are further positioned in accordance with the following criteria: (i) between a gearset associated with a gearbox speed positioned farthest from the engine and a gearset associated with a gearbox speed positioned closest to the engine and (ii) in such a manner that gearsets associated with higher gearbox speeds are positioned closer to the engine.

5. The twin-clutch manual gearbox as claimed in claim 2, wherein the gearsets of the second gearbox speed grouping provided between the second input shaft and the layshaft form an even-numbered gearbox speed grouping.

6. The twin-clutch manual gearbox as claimed in claim 2, wherein the first and second input shafts and the layshaft constitute a shaft arrangement, the twin-clutch manual gearbox further comprising at least one interlocking mechanism for enabling, respectively, appropriate transmission of gearsets associated with the second gearbox speed grouping.

7. The twin-clutch manual gearbox as claimed in claim 1, wherein the second gearbox speed grouping includes a further gearset associated with a gearbox speed intermediate the lowest and highest gearbox speeds, and the further gearset being positioned intermediate the gearset associated with the lowest gearbox speed and the gearset associated with the highest gearbox speed.

8. The twin-clutch manual gearbox as claimed in claim 1, wherein the second gearsets associated with the remaining gearbox speeds of the second gearbox speed grouping are further positioned in accordance with the following criteria: (i) between a gearset associated with a gearbox speed positioned farthest from the engine and a gearset associated with a gearbox speed positioned closest to the engine and (ii) in such a manner that gearsets associated with higher gearbox speeds are positioned closer to the engine.

9. The twin-clutch manual gearbox as claimed in claim 1, wherein the gearsets of the second gearbox speed grouping provided between the second input shaft and the layshaft form an even-numbered gearbox speed grouping.

10. The twin-clutch manual gearbox as claimed in claim 9, wherein the gearset of the second gearsets positioned farthest from the engine is a fourth gear gearset.

11. The twin-clutch manual gearbox as claimed in claim 10, wherein the gearset positioned closest to the engine is a sixth gear gearset, and a second gear gearset is positioned intermediate the fourth and sixth gear gearsets.

12. The twin-clutch manual gearbox as claimed in claim 1, wherein the first gearsets of the first gearbox speed grouping form an odd-numbered gearbox speed grouping.

13. The twin-clutch manual gearbox as claimed in claim 1, wherein the first and second input shafts and the layshaft constitute a shaft arrangement, the twin-clutch manual gearbox further comprising at least one interlocking mechanism for enabling, respectively, appropriate transmission of gearsets associated with the second gearbox speed grouping.

14. The twin-clutch manual gearbox as claimed in claim 13, further comprising a plurality of interlocking mechanisms for enabling, respectively, appropriate transmission of gearsets associated with the second gearbox speed grouping, wherein the plurality of interlocking mechanisms is provided between the second input shaft and the layshaft on a layshaft side of the shaft arrangement.

15. The twin-clutch manual gearbox as claimed in claim 14, wherein the interlocking mechanisms include a specialized interlocking mechanism specialized for enabling appropriate transmission of the gearset positioned closest to the engine, and wherein the specialized interlocking mechanism is positioned between the gearset positioned closest to the engine and a gearset positioned adjacent to the gearset closest to the engine.

16. The twin-clutch manual gearbox as claimed in claim 15, wherein the second gearsets associated with the second gearbox speed grouping form a grouping of a second gear gearset, a fourth gear gearset corresponding to the gearset positioned farthest from the engine and a sixth gear gearset corresponding to the gearset positioned closest to the engine, and wherein the fourth gear gearset is positioned on a side of the layshaft farthest from the engine, the sixth gear gearset is positioned on a side of the layshaft closest to the engine, the second gear gearset is positioned in between the fourth and sixth gear gearsets, one of the interlocking mechanisms common to the second gear gearset and the fourth gear gearset is positioned between the second gear gearset and the fourth gear gearset, and the specialized interlocking mechanism is positioned between the second gear gearset and the sixth gear gearset to enable appropriate transmission of the sixth gearset.

17. The twin-clutch manual gearbox as claimed in claim 16, wherein the sixth gear gearset comprises, in a mutually interlocking manner, a sixth gear input gear which is formed as one unit onto an outer diameter of the second input shaft, and a sixth gear output gear which is rotatably provided on the layshaft, the second gear gearset comprises, in a mutually interlocking manner, a second gear input gear which is formed as one unit onto the outer diameter of the second input shaft, and a second gear output gear which is rotatably provided on the layshaft, and the fourth gear gearset comprises, in a mutually interlocking manner, a fourth gear input gear which is formed as a single unit onto the outer diameter of the second input shaft and a fourth gear output gear which is rotatably provided on the layshaft.

18. The twin-clutch manual gearbox as claimed in claim 1, wherein the layshaft has a maximum diameter approximately at a midway point.

19. The twin-clutch manual gearbox as claimed in claim 18, wherein the midway point is at a position equivalent to a boundary between the second gearsets and the first gearsets.

20. A vehicle having an engine fitted with a twin-clutch manual gearbox as claimed in claim 1.

* * * * *